(12) United States Patent
Yoshida

(10) Patent No.: US 8,872,983 B2
(45) Date of Patent: Oct. 28, 2014

(54) INFORMATION PROCESSING APPARATUS AND DISPLAY PROCESSING METHOD

(71) Applicant: Kabushiki Kaisha Toshiba, Tokyo (JP)

(72) Inventor: Hitoshi Yoshida, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/026,918

(22) Filed: Sep. 13, 2013

(65) Prior Publication Data

US 2014/0184919 A1   Jul. 3, 2014

Related U.S. Application Data

(63) Continuation of application No. PCT/JP2013/058145, filed on Mar. 21, 2013.

(30) Foreign Application Priority Data

Dec. 27, 2012   (JP) .................................. 2012-286090

(51) Int. Cl.
*H04N 5/44* (2011.01)

(52) U.S. Cl.
CPC ....................................... *H04N 5/44* (2013.01)
USPC ........... 348/725; 348/726; 348/729; 348/730; 348/731; 348/501; 348/510; 348/512; 348/575; 725/14; 725/18; 725/20; 725/29; 725/37; 725/44; 725/50; 725/115; 725/116; 725/131; 725/148; 715/716; 715/719

(58) Field of Classification Search
USPC ................. 348/725, 729, 730, 731, 510, 726; 725/14, 18, 20, 29, 37, 44, 50, 115, 725/116, 131, 148, 501, 510, 512, 575; 715/716, 719
See application file for complete search history.

(56) References Cited

U.S. PATENT DOCUMENTS

| | | | |
|---|---|---|---|
| 7,333,949 B2 * | 2/2008 | Shimizu et al. ............... 705/27.1 |
| 8,089,507 B2 * | 1/2012 | Ikeda et al. ..................... 348/43 |
| 2002/0107832 A1 * | 8/2002 | Shimizu et al. .................. 707/1 |
| 2005/0265167 A1 | 12/2005 | Sakon |
| 2010/0005393 A1 * | 1/2010 | Tokashiki et al. ............. 715/716 |
| 2010/0175089 A1 * | 7/2010 | Seo et al. ........................ 725/44 |
| 2010/0208042 A1 * | 8/2010 | Ikeda et al. ..................... 348/53 |

(Continued)

FOREIGN PATENT DOCUMENTS

| | | |
|---|---|---|
| JP | 2004235920 | 8/2004 |
| JP | 2005347797 | 12/2005 |

(Continued)

OTHER PUBLICATIONS

International Search Report from Corresponding PCT/JP203/058145 dated Aug. 6, 2013.

*Primary Examiner* — Jefferey Harold
*Assistant Examiner* — Mustafizur Rahman
(74) *Attorney, Agent, or Firm* — Blakely, Sokoloff, Taylor & Zafman LLP

(57) ABSTRACT

According to one embodiment, an information processing apparatus includes a receiver configured to receive content, an acquiring unit configured to acquire a time required for reproducing the content, a counter configured to count a first time including at least the required time, and a display controller configured to display the content on the display unit and terminate display of a video on the display unit after expiration of the first time.

8 Claims, 4 Drawing Sheets

(56) References Cited

U.S. PATENT DOCUMENTS

| | | |
|---|---|---|
| 2010/0257571 A1* | 10/2010 | Hashimoto et al. ............ 725/116 |
| 2010/0299690 A1* | 11/2010 | Hashimoto et al. .............. 725/14 |
| 2011/0138416 A1* | 6/2011 | Kang et al. ....................... 725/39 |
| 2012/0062711 A1* | 3/2012 | Ikeda et al. ...................... 348/51 |
| 2012/0066235 A1* | 3/2012 | Itakura .......................... 707/751 |
| 2012/0133833 A1 | 5/2012 | Yoshida |
| 2012/0275765 A1* | 11/2012 | Ikeda et al. ................... 386/241 |

FOREIGN PATENT DOCUMENTS

| | | |
|---|---|---|
| JP | 2007027973 | 2/2007 |
| JP | 2008034907 | 2/2008 |
| JP | 2008227895 | 9/2008 |
| JP | 2010087823 | 4/2010 |
| JP | 2011171893 | 9/2011 |
| JP | 2012119937 | 6/2012 |

* cited by examiner

| Timer setting |
|---|
| Content cooperation |
| 30 min |
| 60 min |
| 90 min |
| ⋮ |

FIG. 2

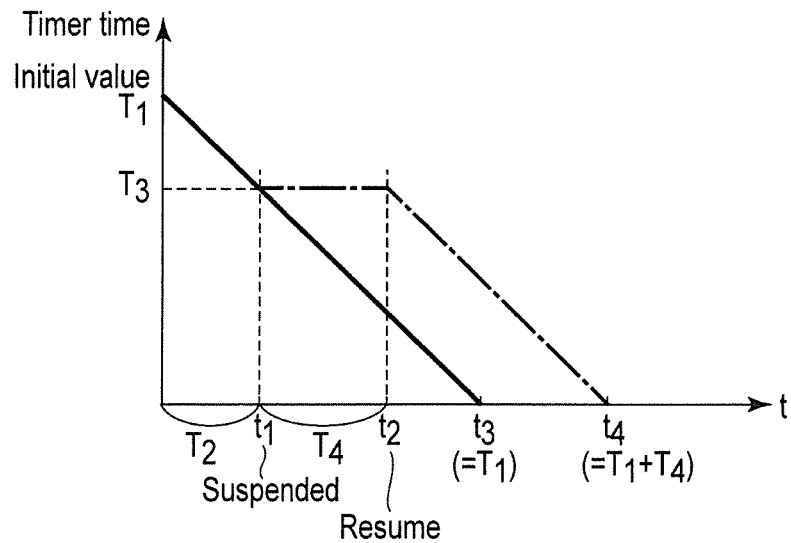
F I G. 4
| Monday | Movie#1 |
| Tuesday | Movie#2 |
| ⋮ | ⋮ |
F I G. 5

INFORMATION PROCESSING APPARATUS AND DISPLAY PROCESSING METHOD

CROSS REFERENCE TO RELATED APPLICATIONS

This application is a Continuation Application of PCT Application No. PCT/JP2013/058145, filed Mar. 21, 2013 and based upon and claiming the benefit of priority from Japanese Patent Application No. 2012-286090, filed Dec. 27, 2012, the entire contents of all of which are incorporated herein by reference.

FIELD

Embodiments described herein relate generally to an information processing apparatus and a display processing method that control video display.

BACKGROUND

A television has various timer functions. The television uses the timer functions to turn ON/OFF a standby power, thereby allowing switching from an active state to a standby state and vice versa.

For example, the television has an off-timer function with which the television terminates video display and switches its operation mode from an active state to a standby state when the set timer time expires. A fixed time length, such as 30 minutes or 60 minutes, can be set in the timer by a viewer as display time of various video contents. This off-timer function can prevent children from viewing video content over a long period of time on the television.

However, a conventional off-timer function takes into account a health aspect of a viewer, but does not consider user's convenience. Here, as an example, there are assumed cases where a time required for reproducing the entire content is larger than a set timer time and where a time required for reproducing the entire content is smaller than a set timer time, but the reproduction of the content is stopped halfway. The television terminates video display when the timer time expires irrespective of whether an end of the content is reached or not. Therefore, there may occur a situation where a viewer cannot view the entire content.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is an exemplary diagram showing an example of a setting screen of an off-timer function according to an embodiment;

FIG. 4 is an exemplary diagram showing an example a display processing using the off-timer function according to an embodiment; and FIG. 5 is an exemplary diagram showing a data diagram used in the off-timer function according to an embodiment.

DETAILED DESCRIPTION

Various embodiments will be described hereinafter with reference to the accompanying drawings.

In general, according to one embodiment, an information processing apparatus comprising: a receiver configured to receive content; an acquiring unit configured to acquire a time required for reproducing the content; a counter configured to count a first time including at least the required time; and a display controller configured to display the content on the display unit and terminate display of a video on the display unit after expiration of the first time.

Embodiments will now be described hereinafter in detail with reference to the accompanying drawings.

Figure 1:
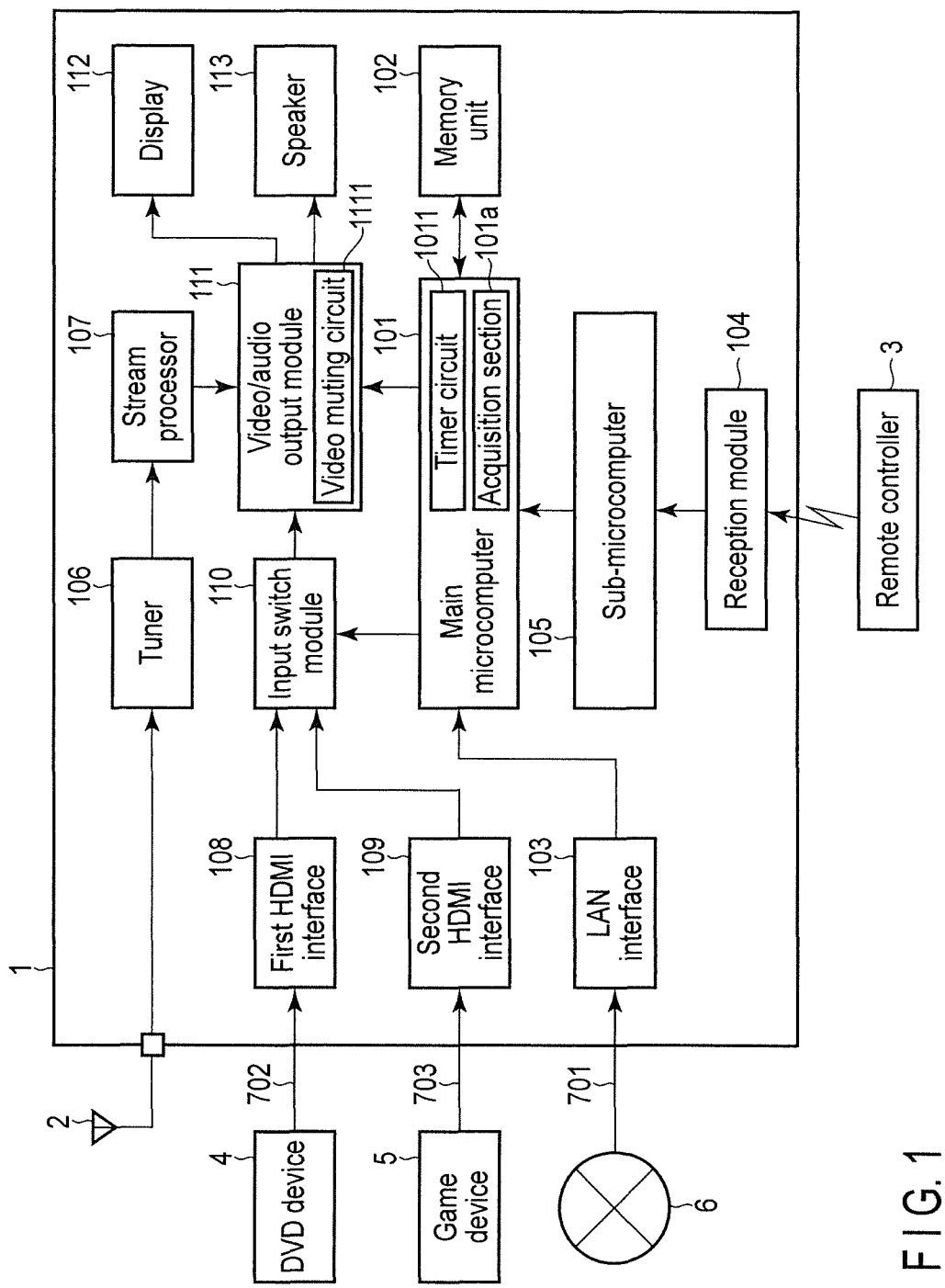
FIG. 1 is an exemplary diagram showing an example of a television receiving apparatus according to an embodiment.

FIG. 1 is a block diagram schematically illustrating a television 1 (information processing apparatus) which is an example according to an embodiment. The television 1 comprises a main microcomputer 101, a memory unit (storage section) 102, a LAN (Local Area Network) I/F (Interface) 103, a reception module 104, a sub-microcomputer 105, a tuner 106, a stream processor 107, a first HDMI (High Definition Multimedia Interface) interface 108, a second HDMI interface 109, an input switch module 110, a video/audio output module 111, a display (display section) 112, and a speaker 113.

The main microcomputer 101 controls operation of each component in the television 1. The main microcomputer 101 controls channel switching, volume adjustment, and the like according to a key code which is information corresponding to a depressed button (key) of a viewer (user)-operable remote controller 3. The main microcomputer 101 is a microcomputer that stops operation when the television 1 is in a standby state. In an embodiment, the standby state refers to a state where only the sub-microcomputer 105 operates and other components of the television 1 stop their operation, as described later. A state where the main microcomputer 101 operates is referred to as an active state.

The main microcomputer 101 comprises a timer circuit (counter) 1011. The timer circuit 1011 counts a set timer time so as to realize various timer functions. For example, the timer circuit 1011 is used to realize an on-timer function that causes the main microcomputer 101 to turn ON a standby power switch at a preset time to switch an operation state of the television 1 from a standby state to the active state and to start video display on the display 112.

Moreover, for example, the timer circuit 1011 is used to realize an off-timer function that causes the main microcomputer 101 to turn OFF the standby power switch when a preset time value expires to terminate the video display on the display 112 and to switch the operation state of the television 1 from the active state to standby state. The timer time in the off-timer function corresponds to display of a video on the display 112. The off-timer function is used for restricting viewing time. For example, parents set a timer time in the off-timer function before or immediately after children start viewing content and whereby visual fatigue of the children can be prevented. The main microcomputer 101 may only terminate the video display on the display 112 when the timer time of the off-timer function expires and may maintain the operation state of the television 1 in the active state.

The memory unit 102 comprises a ROM storing a control program executed by the main microcomputer 101, a non-volatile memory storing various information, and the like. Storage/readout of information in/from the memory unit 102 is performed under control of the main microcomputer 101.

The LAN interface 103 is an interface for connecting to Internet 6 through a LAN cable 701. Information obtained from the Internet 6 through the LAN cable 701 is supplied to the main microcomputer 101.

The reception module 104 is an interface for receiving the key code corresponding to the depressed button of the remote-controller 3 for controlling the television 1. The reception module 104 supplies the key code to the sub-microcomputer 105.

The sub-microcomputer 105 is a microcomputer that is in the active state even when the television 1 is in the standby state. That is, the sub-microcomputer 105 waits for a depression of the button of the remote controller 3 even when the television 1 is in the standby state. When the television 1 is in the active state, the sub-microcomputer 105 supplies the received key code to the main microcomputer 101. On the other hand, when the television 1 is in the standby state, the sub-microcomputer 105 transmits, upon reception of a key code corresponding to a power button, an activation command to the main microcomputer 101 that is not active to activate the main microcomputer 101.

The tuner 106 is a tuner for receiving digital broadcast. The tuner 106 selects a digital broadcast signal received by an antenna 2 based on a viewer's operation on the remote-controller 3. The tuner 106 demodulates the digital broadcast signal and supplies the signal to the stream processor 107.

The stream processor 107 takes out various digital signals from the demodulated digital broadcast signal and supplies a video signal and an audio signal to the input switch module 110.

The first HDMI interface 108 and second HDMI interface 109 are each an interface that can connect, through an HDMI cable, the television 1 and an external device which can mutually control each other. For example, in an embodiment, the first HDMI interface 108 is connected with a DVD (Digital Versatile Disc) device 4 through an HDMI cable 702. Moreover, for example, the second HDMI interface 109 is connected with a game device 5 through an HDMI cable 703. The video signal and audio signal input from the external device to the television 1 through the first HDMI interface 108 or the second HDMI interface 109 are supplied to the input switch module 110. Moreover, the television 1 exchanges information with the external device using an HDMI-CEC (High Definition Multimedia Interface-Consumer Electronics Control) which is a mutual control command through the first HDMI interface 108 or second HDMI interface 109, thereby allowing acquisition of various data from the external device and transmission of a control command to the external device. The above external device connected to the first HDMI interface 108 or the second HDMI interface 109 are merely examples and may be a hard disk recorder and any other device that can input the video signal to the television 1.

The input switch module 110 executes a signal selection operation based on the viewer's operation on the remote-controller 3. The input switch module 110 supplies video and audio signals corresponding to one of selected signal input sources to the video/audio output module 111. In the present embodiment, the signal input source refers to an interface to which a signal allowing a video to be displayed on the display 112 and an audio to be output from the speaker 113 is input. For example, when the tuner 106 is selected as the signal input source, the input switch module 110 supplies video and audio signals acquired through the tuner 106 to the video/audio output module 111. This allows the viewer to enjoy broadcast content. For example, when the first HDMI interface 108 which is an interface for importing an external input signal is selected as the signal input source, the input switch module 110 supplies video and audio signals acquired from the DVD device 4 connected to the first HDMI interface 108 to the video/audio output module 111. This allows the viewer to enjoy DVD content. For example, when the second HDMI interface 109 which is an interface for importing an external input signal is selected as the signal input source, the input switch module 110 supplies video and audio signals acquired from the game device 5 connected to the second HDMI interface 109 to the video/audio output module 111. This allows the viewer to enjoy game content.

The video/audio output module 111 converts the video signal into a video signal of a format that can be displayed on the display 112, and applies adjustment to the resultant video signal according to a screen size of the display 112. The video/audio output module 111 supplies the resultant video signal to the display 112. The display 112 displays a video on a screen thereof based on the supplied video signal. The video/audio output module 111 may have an on-screen display function to display characters such as letters or graphics. The video/audio output module 111 generates a character signal by on-screen display control of the main microcomputer 101. The video/audio output module 111 superimposes the character signal on the video signal to perform on-screen display of the characters on the display 112.

The video/audio output module 111 applies acoustic processing to convert the audio signal into an audio signal of a format that can be reproduced by the speaker 113, followed by amplification, moreover. The video/audio output module 111 supplies the resultant audio signal (stereo L and R signals) to the speaker 113. The speaker 114 outputs an audio based on the audio signal. The video/audio output module 111 comprises a video muting circuit 1111 that operates under control of the main microcomputer 101 based on the viewer's operation on the remote controller 3. When terminating video display, the video/audio output module 111 activates the video muting circuit 1111 to switch a display state of the display 112 to a video mute state. The video mute state refers to a state where a normal video signal is not displayed with the screen of the display 112 filled with a single color (e.g., blue back).

The following describes setting of the off-timer function according to an embodiment. In an embodiment, content to which the off-timer function is set is content, such as a drama or a movie, in which a required time (reproduction time) is prescribed and to be input to the television 1 from an external source. In an embodiment, the required time refers to a time required to reproduce the entire content seamlessly at a 1× speed. For example, the content for which the off-timer function is set includes DVD content that can be acquired from the DVD device 4 through the HDMI interface, game content that can be acquired from the game device 5 through the HDMI interface, content stored in a hard disk recorder that can be acquired therefrom through the HDMI interface, broadcast content that can be acquired from the tuner 106, content that can be acquired from the Internet 6 through the LAN interface 103, and the like. Thus, the first HDMI interface 108 and second HDMI interface 109 each function as a receiving means for receiving content from an external device connected to the television 1. The tuner 106 functions as a receiving means for receiving content from a broadcast wave. The LAN interface 103 functions as a receiving means for receiving content from the Internet 6.

For example, a viewer sets the off-timer function when content that the viewer will view (hereinafter, referred to as "content to be viewed") is displayed on the display 112. When the viewer operates a menu key of the remote controller 3 for setting the off-timer function, the main microcomputer 101 performs on-screen display of a menu screen on the display 112. Then, when the viewer selects the setting of the off-timer function from the menu screen, the main microcomputer 101 controls to perform on-screen display of the setting screen of the off-timer function. FIG. 2 is a view illustrating an example of a setting screen of the off-timer function according to the embodiment. The setting screen displays candidates of a timer time (setting value) to be set in the timer circuit 1011 as the off-timer function.

In FIG. 2, as an example, the setting screen displays fixed timer time fields (30 minutes, 60 minutes, and 90 minutes) and a "content-cooperated" field. The viewer uses the remote controller 3 to move a cursor to one of the fields to thereby select a desired timer time.

The "content-cooperated" will be described. The "content-cooperated" is a menu for setting a time conforming to the required time of the content to be viewed as a time value. The main microcomputer 101 (acquisition section 101a) acquires the required time of the content to be viewed from an external source that supplies the content to be viewed to the television 1. The main microcomputer 101 identifies the external source of the content to be viewed, i.e., content to be displayed on the display 112 depending on a selected signal input source. In a case where the content to be viewed is the DVD content that can be acquired from the DVD device 4 through the first HDMI interface 108, the main microcomputer 101 (acquisition section 101a) can acquire the required time of the content from the DVD device 4 (e.g., content itself to be reproduced or a disc inserted into the DVD device 4) by using the HDMI-CEC. In a case where the content to be viewed is game content that can be acquired from the game device 5 through the second HDMI interface 109, the main microcomputer 101 (acquisition section 101a) can acquire the content required time from the game device 5 (e.g., content itself to be reproduced or a disc inserted into the game device 5) by using the HDMI-CEC. In a case where the content to be viewed is content that can be acquired from the hard disk recorder through the HDMI interface, the main microcomputer 101 (acquisition section 101a) can acquire the content required time from the hard disk recorder (e.g., content itself to be reproduced stored in the hard disk recorder) by using the HDMI-CEC. In a case where the content to be viewed is broadcast content that can be acquired from the tuner 106, the main microcomputer 101 (acquisition section 101a) can acquire the content required time from a digital broadcast signal through the tuner 106. In a case where the content to be viewed is content that can be acquired from the Internet 6 through the LAN interface 103, the main microcomputer 101 (acquisition section 101a) can acquire the content required time from an external source on the Internet 6 through the LAN interface 103. When the main microcomputer 101 (acquisition means 101) fails to the content required time mainly from the external device or digital broadcast signal, it may acquire the content required time from the Internet 6 through the LAN interface 103 based on meta-data of the content to be viewed.

The main microcomputer 101 may display a timer time based on the content required time in the field of the "content-cooperated" on the setting screen illustrated in FIG. 2. For example, the content required time is 137 minutes, the main microcomputer 101 displays "137 minutes" in the field of the "content-cooperated" as a timer time of the "content-cooperated". The main microcomputer 101 may set a value obtained by adding a predetermined time length (e.g., ten minutes) to the content required time as the timer time of the "content-cooperated". That is, the main microcomputer 101 sets a time length including at least the content required time as the timer time of the "content-cooperated". The reason for adding a predetermined time length to the content required time is that a predetermined margin is added to video display of the display 112 is not terminated simultaneously with the end of the content, but is terminated with time to spare.

When detecting selection of "content-cooperated" by the viewer's operation on the remote controller 3 and subsequent depression of an enter key, the main microcomputer 101 sets a time value in the timer circuit 1011 and then activates the off-timer function. Upon setting of the timer time, the timer circuit 1011 starts counting the timer time.

When the main microcomputer 101 fails to acquire the content required time, it may display only the fixed timer time fields on the setting screen of FIG. 2. The main microcomputer 101 may display a field for setting a passcode on the setting screen. The passcode is input on the setting screen when the time value once set for the content to be viewed needs to be changed. The use of the passcode prevents a setting that has once been made by parents from being changed by children.

Figure 3:
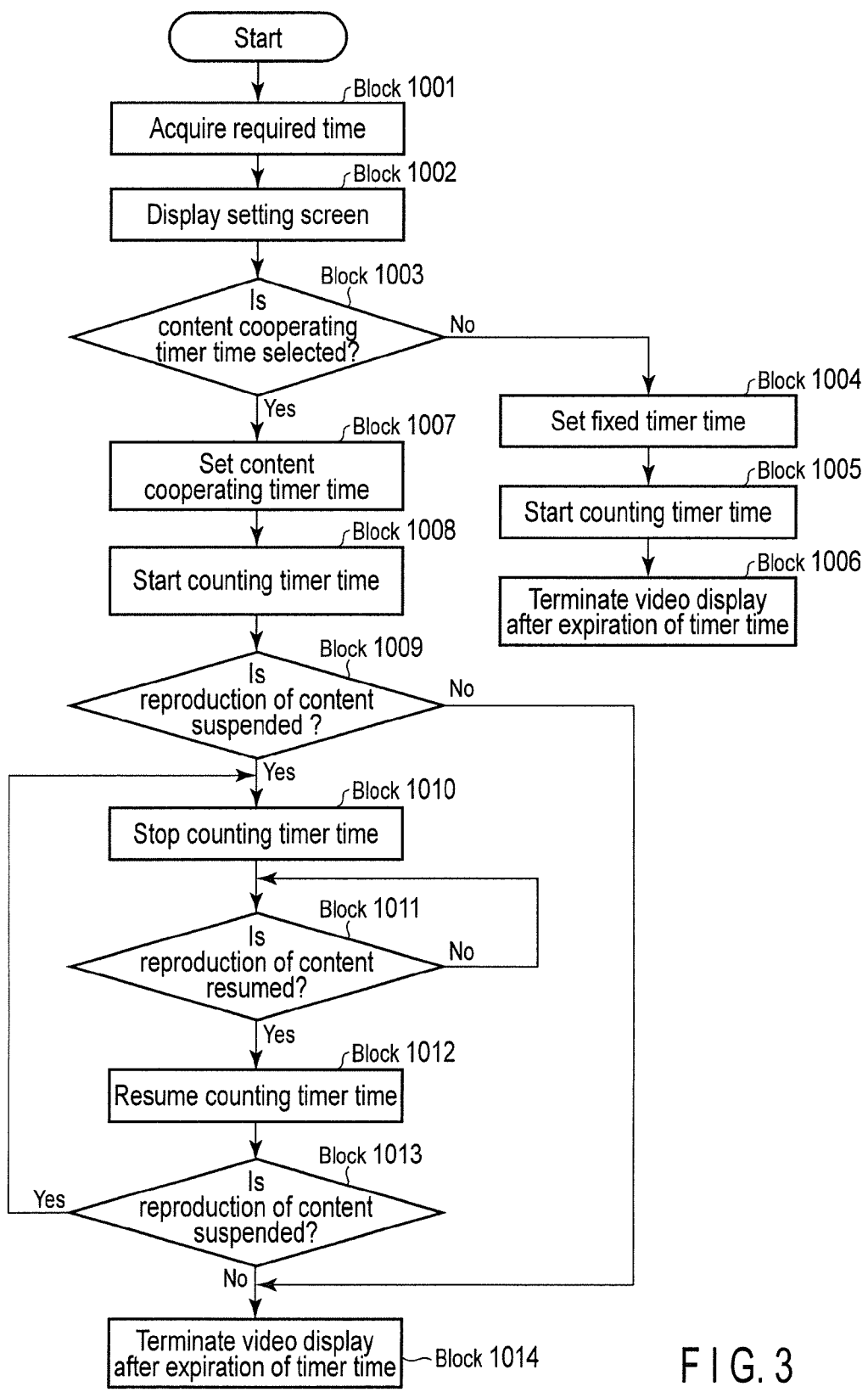
FIG. 3 is an exemplary diagram showing an example of a video display processing using the off-timer function according to an embodiment.

The following describes video display processing using the off-timer function. FIG. 3 is a flowchart of an example of the video display processing using the off-timer function according to the embodiment. The main microcomputer 101 acquires the required time of the content to be viewed based on an off-timer setting request from the viewer (Block 1001). In Block 1001, the video/audio output module 111 displays the content to be viewed on the display 112. In a case where the content to be viewed is broadcast content, the video/audio output module 111 displays, on the display 112, a video of content whose broadcast has been started. In a case where the content to be viewed is content, such as DVD content, for which operations such as reproduction and stop can be made, the video/audio output module 111 displays, on the display 112, a screen before start of reproduction or a video of the content whose reproduction has been started in response to the viewer's operation on the remote-controller 3. The main microcomputer 101 acquires the content required time as described above. The main microcomputer 101 displays, on the display 112, a setting screen of the off-timer function on which a plurality of timer times can be selected as illustrated in FIG. 2 (Block 1002).

The main microcomputer 101 determines whether or not the content cooperating timer time is selected as the timer time by the viewer's operation on the remote controller 3 (Block 1003). When the content-cooperated time value is not selected, that is, when the fixed timer time is selected (No in Block 1003), the main microcomputer 101 sets the selected fixed timer time in the timer circuit 1011 and activates the off-timer function (Block 1004). The timer circuit 1011 starts counting the set timer time (Block 1005). Here, in response to the viewer's operation, the video/audio output module 111 occasionally displays, on the display 112, a video of the content whose reproduction has been started at the same timing as the start of counting of the timer time by the timer circuit 1011. When the timer time counted by the timer circuit 1011 expires, the main microcomputer 101 terminates video display on the display 112 (Block 1006). In Block 1006, the video/audio output module (displaying control section) 111 terminates video display on the display 112 after expiration of the fixed timer time.

In a case where the content cooperating timer time is selected (Yes in Block 1003), the main microcomputer 101 sets the content cooperating timer time in the timer circuit 1011 and activates the off-timer function (Block 1007). The timer circuit 1011 starts counting the content cooperating timer time (Block 1008). Here, in response to the viewer's operation, the video/audio output module 111 occasionally displays, on the display 112, a video of the content whose reproduction has been started at the same timing as the start of counting of the timer time by the timer circuit 1011.

The main microcomputer 101 determines whether or not the reproduction of the content is suspended (stop) before expiration of the timer time (Block 1009). In Block 1009, the main microcomputer 101 determines the reproduction of the content is suspended (interrupted) by confirming absence of input of a signal corresponding to the content to be viewed with respect to any component of the television 1. The "stop (suspended)" in Block 1009 refers to an operation for allowing restart (including resume reproduction) of the content from a stopped scene when the reproduction of the content is resumed and corresponds to, e.g., pause.

When the reproduction of the content is not suspended (No in Block 1009), the main microcomputer 101 terminates video display on the display 112 upon expiration of the timer time counted by the timer circuit 1011 (Block 1014). In Block 1014, the video/audio output module (displaying control section) 111 terminates video display on the display 112 upon expiration of the content cooperating timer time. When the reproduction of the content is suspended (Yes in Block 1009), the main microcomputer 101 controls the timer circuit 1011 to stop counting the timer time (Block 1010).

The main microcomputer 101 determines whether or not the reproduction of the content is resumed (Block 1011). In Block 1011, the main microcomputer 101 determines whether or not the reproduction of the content is resumed by confirming that input of a signal corresponding to the content to be viewed with respect to any component of the television 1. If, the reproduction of the content is not resumed (No in Block 1011), the main microcomputer 101 waits until the reproduction of the content is resumed. When the reproduction of the content is resumed (Yes in Block 1011), the main microcomputer 101 controls the timer circuit 1011 to resume counting the timer time (Block 1012). The content to be displayed on the display 112 is resumed from the stopped scene.

The main microcomputer 101 determines whether or not the reproduction of the content is suspended (stopped) before expiration of the timer time (Block 1013). When the reproduction of the content is suspended (Yes in Block 1013), a processing flow returns to Block 1010. When the reproduction of the content is not suspended (No in Block 1013), the main microcomputer 101 terminates video display on the display 112 upon expiration of the timer time counted by the timer circuit 1011 (Block 1014).

FIG. 4 is a schematic view of the display processing using the off-timer function described using FIG. 3 in a case where the content cooperating timer time is set. A horizontal axis represents an elapsed time, and a vertical axis represents a residual time of the timer time. A continuous line represents a case where the reproduction of the content is not stopped before expiration of the timer time. A dashed line represents a case where the reproduction of the content is stopped before expiration of the timer time. In this example, an initial value of the content cooperating timer time is assumed to be T1.

A case where the reproduction of the content is not stopped before expiration of the timer time will be described. When the timer time reaches t3 (=T1), the timer time expires, and the timer circuit 1011 terminates counting. At this time, the main microcomputer 101 terminates video display on the display 112.

A case where the reproduction of the content is stopped before expiration of the timer time will be described. When the reproduction of the content is stopped at t1, the timer circuit 1011 stops counting of the timer time based on the stop of the reproduction of the content. The main microcomputer 101 calculates a reproduction duration time T2 from a time (t=0) at which counting of the timer time is started to t1. The main microcomputer 101 stores, in the memory unit 102, a residual count time T3 obtained by subtracting the reproduction duration time T2 from the initial value T1 of the timer time. When the reproduction of the content is resumed at time t2, the counting of the timer time is resumed based on the resume of the reproduction of the content. For example, the main microcomputer 101 sets the residual count time T3 in the timer circuit 1011. The timer circuit 1011 starts counting the residual count time T3. When the timer time reaches t4, the timer time expires, and the timer circuit 1011 terminates counting. At this time, the main microcomputer 101 terminates video display on the display 112. Assuming that a time interval between the t1 at which the reproduction of the content is stopped and time t2 at which the reproduction is resumed is an interruption time T4, t4 at which the timer circuit 1011 terminates counting corresponds to a time obtained by adding the interruption time T4 to the initial value T1 of the timer time. That is, the main microcomputer 101 can extend a display time of a video to be displayed on the display 112 up to a time obtained by adding the interruption time of the content to the initial value of the timer time.

According to the present embodiment, it is possible to set, in conformity with the content required time, the content cooperating timer time as the display time of a video on the display 112.

Moreover, even when the viewer interrupts the reproduction of the content within the content cooperating timer time, the television 1 can continue displaying the content on the display 112 until the end of the content. Thus, even in a situation where the off-timer function is activated, the viewer can reliably enjoy viewing of the content to the end.

As another aspect, the viewer may previously register setting of the off-timer function in units of content scheduled to be viewed. The main microcomputer 101 stores in the memory unit 102, based on the viewer's operation on the remote-controller 3, information of content scheduled to be viewed and for which the timer circuit 1011 is activated with the content cooperating timer time set as the off-timer function. The main microcomputer 101 may previously acquire the required time of each content and store the information of each content in the memory unit 102 in association with the timer time.

When determining that the reproduction or broadcast of content that has been previously registered in the memory unit 102 is started, the television 1 acquires, as needed, the required time of the content and executes the processing from Block 1007 to Block 1014. That is, the timer circuit 1011 starts counting the content cooperating timer time corresponding to the content previously registered in the memory unit 102 based on the start of the reproduction of the previously registered content. FIG. 5 is an example of a data diagram of the previously registered content. The main microcomputer 101 stores in the memory unit 102, based on viewer's operation on the remote controller 3, information of content scheduled to be viewed in association with a day of the week (or date). When determining that the reproduction or broadcast of the content previously registered in the memory unit 102 is started on the associated day, the television 1 acquires, as needed, the required time of the content and then executes the processing from Block 1007 to Block 1014.

According to the above aspect, the viewer need not set the off-timer function for each viewing of content. Moreover, parents can adequately manage content viewing time of children.

As still another aspect, after activating the off-timer function, the main microcomputer 101 may perform on-screen display of a text message saying "content ends in ten minutes" and "content ends in one minute", etc., on the display 112 ten minutes and one minute before the timer time expires. Moreover, when detecting that the timer time expires and switching the operation state of the television 1 from the active state to standby state, the main microcomputer 101 may store in the memory unit 102 information indicating that it turns OFF the standby power switch based on the off-timer function. In this case, the television 1 can be returned to the active state when the viewer turns ON the power switch of the television 1. However, the main microcomputer 101 compares a storage state of the memory unit 102 and presence/absence of the operation on the remote controller 3 and, when detecting absence of the operation on the remote controller 3, continues a video mute state. Even if an instruction of displaying content other than content for which the off-timer function is set is input by the viewer's operation on the remote controller 3, the main microcomputer 101 may suppress control of the input switch module 110 to thereby continue the video mute state. That is, the main microcomputer 101 does not display a video on the display 112 in the absence of the operation on the remote controller 3. According to the above aspect, the viewer can view content only within a timer time set by the off-timer function. This can prevent visual fatigue of the children.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information reproducing apparatus comprising:
a receiver configured to receive content from an external device connected to the information processing apparatus;
an acquiring module configured to acquire a time required for reproducing the content;
a counter configured to count a first time including at least the required time; and
a display controller configured to display the content on a display and terminate display of a video on the display after expiration of the first time.

2. The information reproducing apparatus of claim 1, wherein the counter stops counting the first time based on stop of reproduction of the content and resumes counting the first time based on resume of reproduction of the content.

3. The information reproducing apparatus of claim 1, wherein the first time corresponds to a time obtained by adding a predetermined second time to the required time.

4. The information reproducing apparatus of claim 1, wherein the acquiring module acquires the required time from the external device using a mutual control command.

5. The information reproducing apparatus of claim 1, wherein the acquiring module acquires the required time from the Internet based on meta-data of the content.

6. The information reproducing apparatus of claim 1, further comprising:
a storage configured to store information of first content for which the counter is activated.

7. The information reproducing apparatus of claim 6, wherein the counter starts counting the first time corresponding to the first content based on start of reproduction of the first content.

8. A displaying processing method comprising:
acquiring a time required for reproducing content received by an information reproducing apparatus and received as input from an external source;
counting, by the information processing apparatus, a first time including at least the required time; and
terminating, by the information processing apparatus, display of a video on a display after expiration of the first time.

* * * * *